United States Patent [19]

Masclet

[11] 4,199,119
[45] Apr. 22, 1980

[54] WING MOUNTED RETRACTABLE AIRCRAFT UNDERCARRIAGES

[75] Inventor: Jean Masclet, Paris, France

[73] Assignee: Messier-Hispano-Bugatti, Montrouge, France

[21] Appl. No.: 913,352

[22] Filed: Jun. 7, 1978

[30] Foreign Application Priority Data

Jun. 10, 1977 [FR] France ................ 77 17832

[51] Int. Cl.² .............. B64C 25/12; B64C 25/18
[52] U.S. Cl. .................. 244/102 SS; 244/102 R; 244/104 FP
[58] Field of Search .......... 244/100 R, 102 R, 102 A, 244/102 SS, 103 R, 104 R, 104 FP

[56] References Cited

U.S. PATENT DOCUMENTS

| | | | |
|---|---|---|---|
| 2,974,909 | 3/1961 | Perdue | 244/102 R |
| 3,899,147 | 8/1975 | Masclet et al. | 244/102 R |

*Primary Examiner*—Charles E. Frankfort
*Attorney, Agent, or Firm*—Scully, Scott, Murphy & Presser

[57] ABSTRACT

A wing mounted retractable aircraft undercarriage with a trailing wheel or wheels comprising a rigid leg casing, pivotally mounted on the wing about a retraction axis, a rocking lever pivoted on the leg casing, supporting the wheel or wheels and mounting the lower pivot connection of a shock absorber located behind the leg casing, an upper pivot connection of the shock absorber to a lever, which lever is pivotable on the leg casing about an articulation axis which is distinct from the retraction axis, a rod of fixed length pivoted at one end to the lever and at the other end to a fixed position on the wing, so that upon retraction of the undercarriage by the action of a retraction jack, the rod causes rotation of the lever with respect to the leg casing, which rotation, by traction of the expanded shock absorber causes pivoting, with respect to the leg casing, of the rocking lever mounting the wheel or wheels towards the retraction axis, and thus an overall shortening of the undercarriage. Preferably the axis of the pivot connection of the shock absorber to the lever and the articulation axis are aligned with the longitudinal axis of the shock absorber in the undercarriage down position. The rod and the articulation axis are preferably disposed in relation to the retraction axis in such a way that during retraction the extent of rotation of the lever with respect to the leg casing is greater than the extent of the rotation of the leg casing with respect to the wing.

8 Claims, 7 Drawing Figures

WING MOUNTED RETRACTABLE AIRCRAFT UNDERCARRIAGES

The invention relates to wing mounted retractable aircraft undercarriages with a trailing wheel or wheels.

In undercarriages of this kind, it is sometimes necessary or desirable to shorten the overall length of the undercarriage upon retraction. This may be necessary due to the selected track having regard to the height of the undercarriages and/or to the depth of the wing so that the wheels of the undercarriages may be housed for example, near to the plane of symmetry of the aircraft without interfering with one another if lifting is lateral, or alternatively be housed in a pod or housing of limited length in the wing if lifting is longitudinal in relation to the aircraft.

Wing mounted undercarriages with a trailing wheel or wheels are already known, that is to say wherein each undercarriage is articulated on a respective wing about a retraction axis and wherein the wheel or wheels are carried by a rocking lever to which the lower end of a shock absorber is pivoted, the rocking lever being pivoted to a leg casing of the undercarriage, wherein the shortening of each undercarriage during retraction is carried out by retracting the wheels by means of traction on the shock absorber, acting as a control rod and having its upper end hinged at a fixed position on the wing structure at a position spaced from the retraction axis, the shock absorber thus acting as a constant length control rod or radius arm during retraction.

Bearing in mind the various characteristics of wings, particularly in the case of thin wings, it is not always possible to locate this fixed position connection in the wing in a manner such that the wing will withstand the great stresses applied by the shock absorber.

The invention has among its objects to resolve in a most advantageous manner the problem of shortening the undercarriages during retraction in the case of wing mounted landing gear with trailing wheels, of the kind comprising two undercarriages each having a rigid leg casing to which a rocking lever supporting the respective wheel or wheels is pivoted, the rocking lever bearing the lower pivot mounting of a shock absorber situated behind the leg casing, in such a way that the undercarriage according to the invention is capable of being fitted to aircraft with thin wings and of being retracted completely into the profile of the aircraft. Preferably, the undercarriage according to the invention will not require a supplementary connection on the structure capable of withstanding the great stresses sustained by the shock absorber.

Accordingly the invention provides the upper pivot connection of the shock absorber to a lever, which lever is pivotable on the leg casing about an articulation axis which is distinct from the retraction axis, a rod of fixed length pivoted at one end to the lever and at the other end to a fixed position on the wing, so that upon retraction of the undercarriage by the action of a retraction jack, the rod causes rotation of the lever with respect to the leg casing, which rotation, by traction of the expanded shock absorber causes pivoting, with respect to the leg casing, of the rocking lever mounting the wheel or wheels towards the retraction axis, and thus an overall shortening of the undercarriage.

Preferably, a line joining the pivot connection of the shock absorber to the lever and said articulation axis is aligned with the longitudinal axis of the shock absorber in the undercarriage down position, thus permitting only limited stresses to be transmitted in the rod and thus by way of its fixed position connection to the wing.

In order to permit the retraction of the undercarriage with a lever of small dimensions, thus facilitating still more the retraction from the upper pivot connection of the shock absorber into the profile of the aircraft, the rod and said articulation axis are disposed in relation to the retraction axis in such a way that the extent of the rotation of the lever with respect to the leg casing is greater than the extent of the rotation of the leg casing with respect to the wing during retraction.

The invention is diagrammatically illustrated by way of example in the accompanying drawings, in which.

Figure 1:
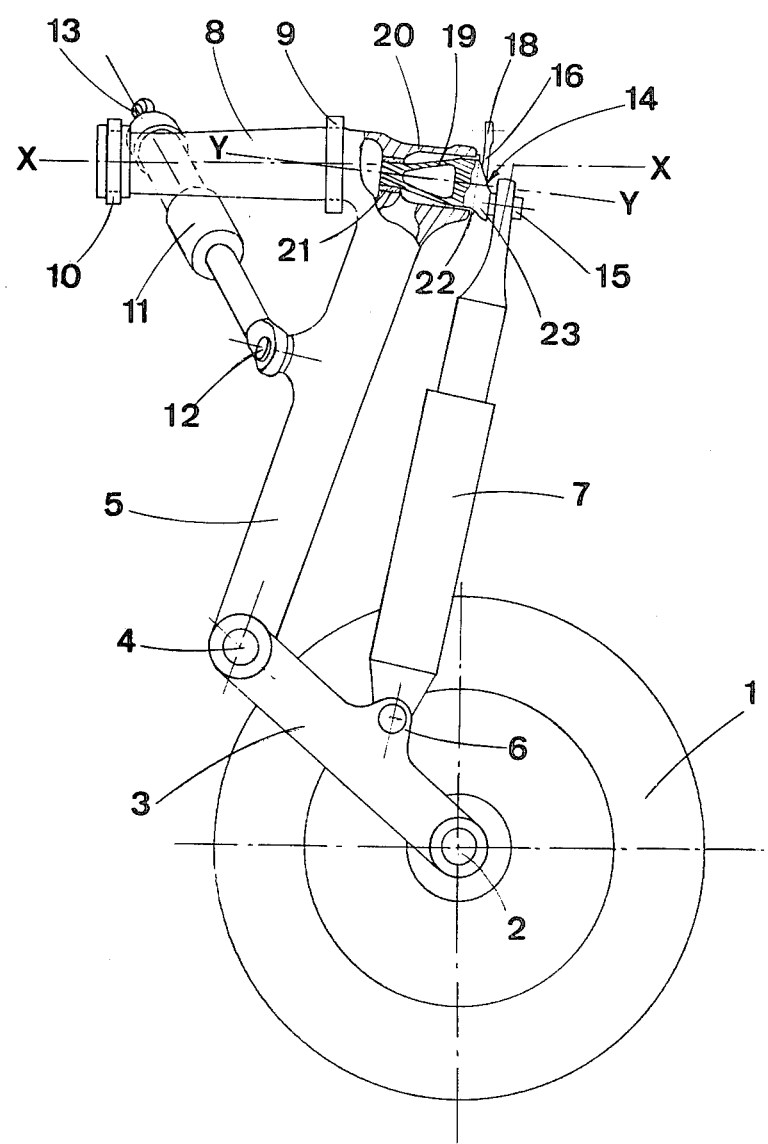
FIG. 1 is a side view, partially in section, of a first embodiment of a lefthand wing mounted retractable aircraft undercarriage according to a first embodiment, in the undercarriage down position, a righthand undercarriage being symmetrical therewith.
Figure 2:
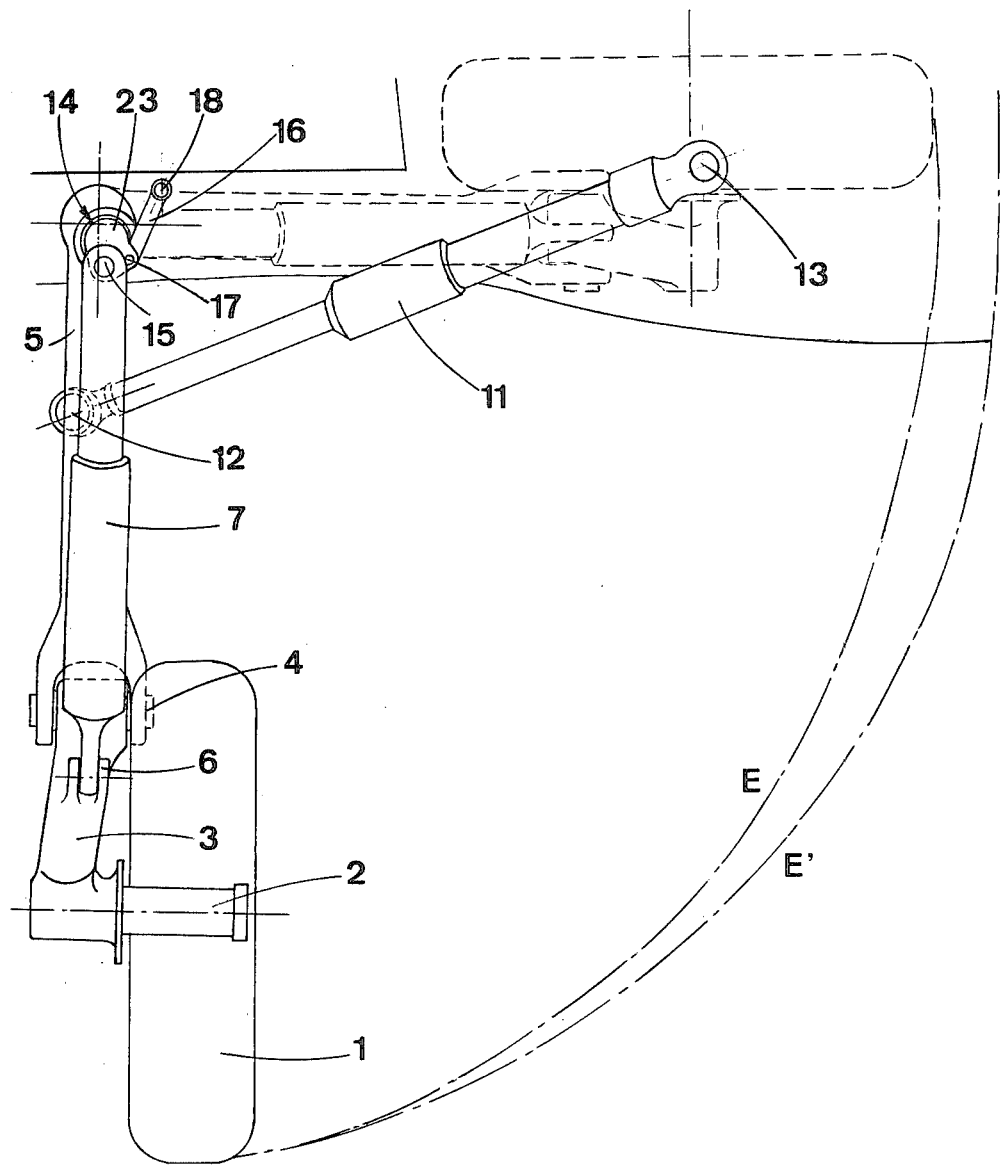
FIG. 2 is an elevation from the rear of the aircraft, of the undercarriage of FIG. 1, broken lines illustrating the undercarriage in the undercarriage raised position.
Figure 3:
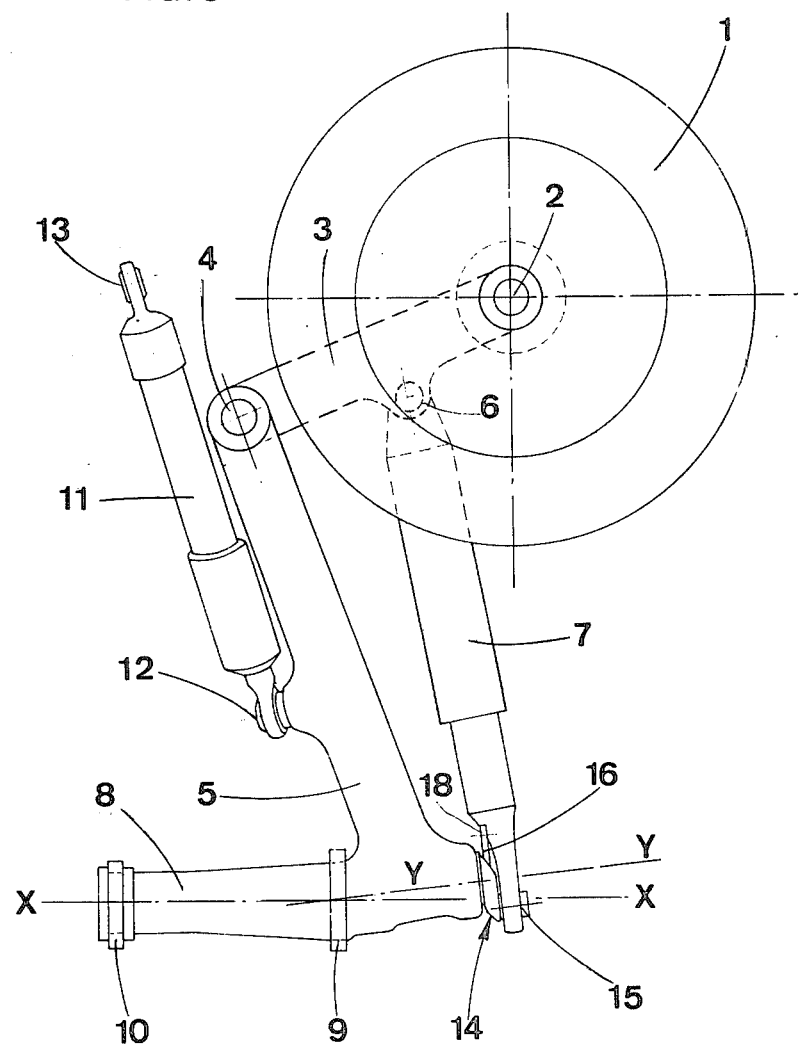
FIG. 3 is a plan view of the undercarriage of FIGS. 1 and 2 in the undercarriage raised position.
Figure 4:
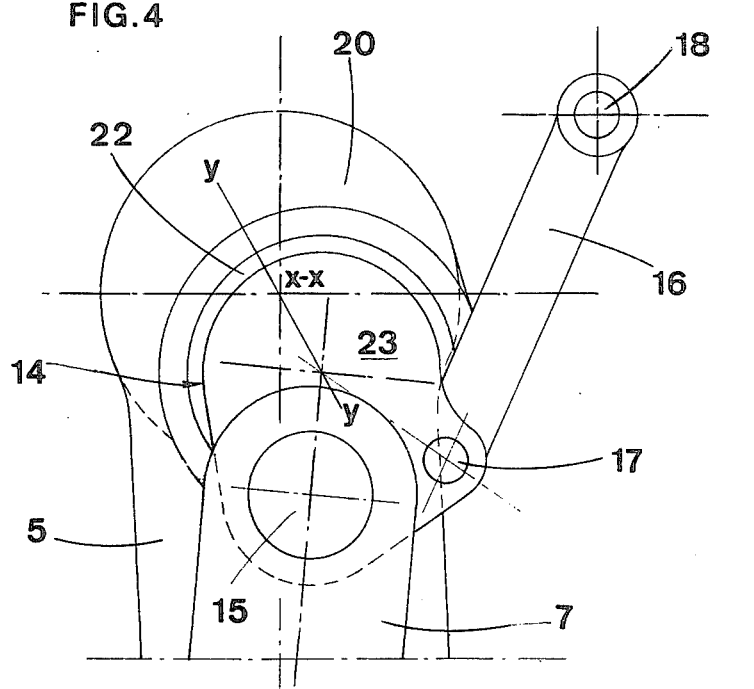
FIGS. 4 and 5 are views to a larger scale of a part of FIG. 2 illustrating the positions of a rod and a lever bearing a shock absorber in the undercarriage down position and the undercarriage up position respectively.
Figure 5:
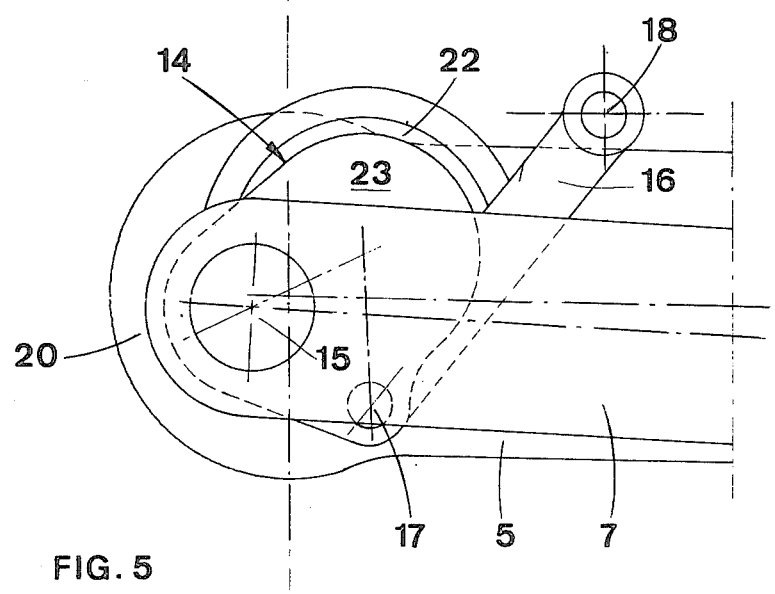

Referring to FIGS. 1 to 5, an undercarriage has a single wheel 1, mounted on an axle 2, but it is to be understood that the invention applies to cases where the undercarriage has more than one wheel for example disposed in a tandem arrangement or side by side in a diabolo arrangement. The axle 2 is mounted on a rocking lever 3 pivoted at 4 to a leg casing 5, the rocking lever 3 being provided with a mounting 6 to which the lower end of a shock absorber 7 positioned behind the leg casing 5 is pivoted.

The upper end of the leg casing 5 position, has a pivot portion 8 which extends in a forward direction and is mounted in bearings 9 and 10 in supports provided in the wing structure of the aircraft and by means of which the undercarriage is cantilevered onto the wing, the pivot axis XX of pivot member 8 forming the axis of retraction of the undercarriage, which, in this example extends parallel to the longitudinal axis of the aircraft in order to permit lateral lifting, by the action of a retraction jack 11 pivoted at a fixed position 12 on the leg casing 5 and at a fixed position 13 on the structure of the aircraft.

The retraction jack 11, which likewise acts as a windbracing jack for the undercarriage in the undercarriage down position, can be a hydraulic jack of the kind well known in the field of undercarriage technology, and may have an internal device with mechanical locking and hydraulic unlocking in the extended condition, which corresponds to the undercarriage down position, and, if required, a similar device effective in the compressed condition, which corresponds to the undercarriage raised position.

The shock absorber 7 is pivoted at its upper end at 15 to a lever 14, which in turn is mounted in a rear portion of the upper part of the leg casing 5 for rotation about an axis YY distinct from the retraction axis XX and inclined in relation to the axis XX, a rod 16 of fixed length being pivoted at 17 to the lever 14 and at a fixed position 18 on the wing. As can be particularly seen from FIGS. 2 and 4, the pivot connection of the lever 14 to the leg casing 5 in the undercarriage down position and the pivot connection at 17 of the rod 16 to the lever 14 are disposed below and on the retraction side of the retraction axis XX in relation to the aircraft, the position 18 at which the rod 16 is pivoted to the wing being disposed above and on the retraction side of the retraction axis in relation to the aircraft.

In this first embodiment the lever 14 comprises a shaft 19 being substantially truncated in shape and pivotally mounted about the axis YY by way of its two cylindrical portions received in bearings 21 and 22 of a sleeve 20 provided in the leg casing 5 and open to the rear of the portion of the leg casing 5 which is uppermost in the undercarriage down position (see partial section in FIG. 1), the shaft 19 being formed to present a crank pin 23, to which crank pin are pivoted about axes, eccentric in relation to the axis YY of the shaft 19 and thus of the lever 14 in the casing 5, the shock absorber 7 at 15 and the rod 16 at 17.

Furthermore, in the undercarriage down position, a line joining the pivot connection 15 of the shock absorber 7 on the lever 14 and the pivot connection of the lever 14 in the leg casing 5, is aligned with the longitudinal axis of the shock absorber 7. In this way, the undercarriage in the undercarriage down position behaves in a better way than known undercarriages with trailed wheels, since during landing and taxi-ing the shock absorber 7 is compressed by the reaction with the ground which opposes its internal stress, the stresses of the shock absorber being absorbed by the shaft 19 of the lever 14 and thus by the casing 5 without being applied to the rod 16.

The connection of the rod 16 to the wing at the fixed position 18, does not therefore need to be a connection capable of sustaining great stresses. p As the undercarriage is raised, through the retraction of the rod of the retraction and wind bracing jack 11, the leg casing 5 is rotated about the axis XX through an angle of approximately 90°. Simultaneously, the rod 16 controls the rotation of the lever 14 in relation to the leg casing 5 about the axis YY (see FIGS. 4 and 5) which causes, by traction of the expanded shock absorber 7 which acts as a control rod or radius arm of constant length, the assembly comprising the rocking lever 3 and the wheel 1 to be retracted towards the retraction axis XX and thus causes an overall shortening of the undercarriage during retraction, as shown by the divergence of lines E and E' on FIG. 2 which represent respectively the path of the wheel 1 with and without such shortening, as can be verified by comparing the overall dimensions of the undercarriage in FIGS. 1 and 3.

Due to the particular positions of the positions of articulation of the rod 16 and the lever 14 in relation to the retraction axis XX, the rotation of the lever 14 in the leg casing 5 is considerably increased during retraction in relation to the rotation of the leg casing 5 around the lifting axis, so that the shortening is in turn is increased, and may be carried out by a lever of small dimensions, which permits the housing of the retraction device assembly, including the upper connection point of the shock absorber, in the profile of even a thin wing.

Figure 6:
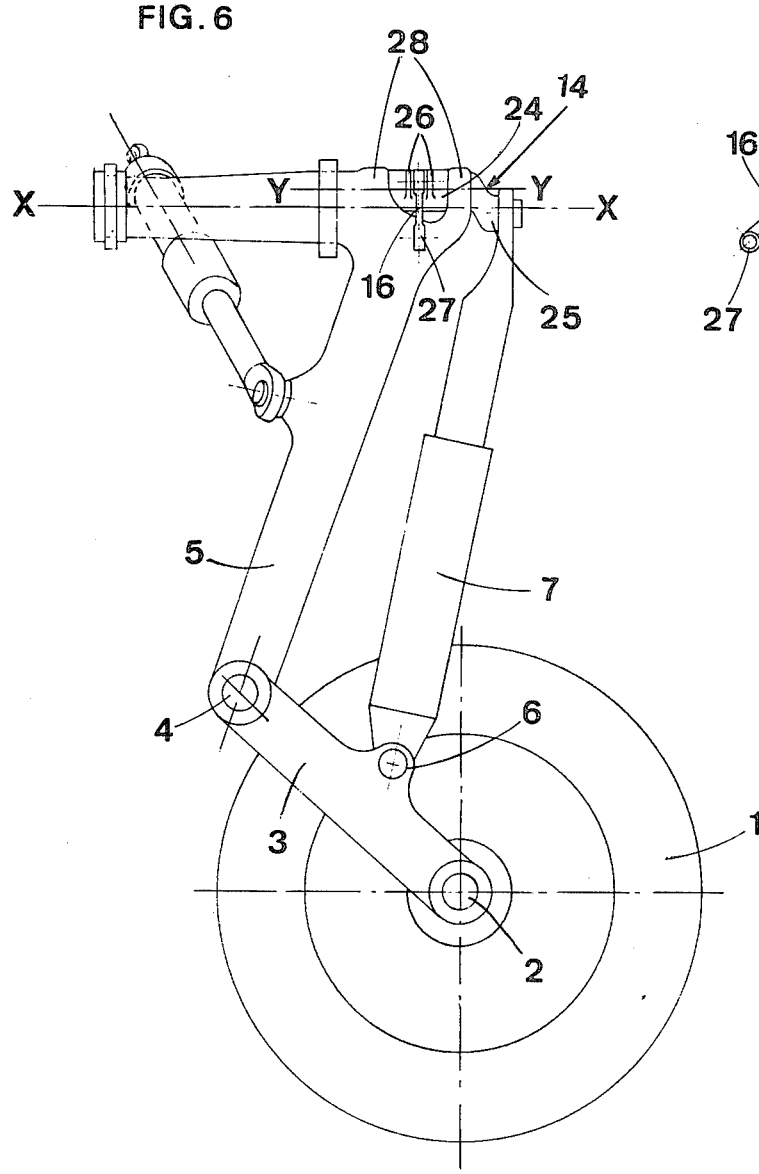
FIG. 6 is a view similar to FIG. 1, but illustrating a second embodiment of a wing mounted retractable aircraft undercarriage according to the invention.
Figure 7:
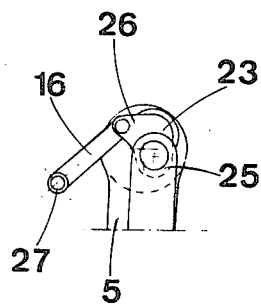
FIG. 7 is a fragmentary elevation, from the rear of the aircraft, of the undercarriage of FIG. 6 in the undercarriage down position.

The second embodiment shown in FIGS. 6 and 7, only differs from the first embodiment in the disposition of the rod 16 and the pivot connection of the lever 14 relative to the retraction axis and in the disposition of the lever 14 and its mounting in the leg casing 5.

The pivot axis YY of the lever 14 in the leg casing 5, in the undercarriage down position, is disposed above and on the retraction side of the retraction axis XX in relation to the aircraft, and the rod 16 is pivoted to the lever 14 and to the wing at positions disposed on the opposite side to the retraction side and respectively above and below the retraction axis XX in relation to the aircraft. Furthermore, the articulation axis YY of the lever 14 on the leg casing 5 is substantially parallel to the longitudinal axis of the aircraft, as well as to the retraction axis XX, since this second embodiment is also for an undercarriage with lateral lifting. In this embodiment the lever 14 comprises a shaft 24, of a general cylindrical shape, pivotally mounted in the leg casing 5 and having a first arm 25, to the end of which the upper end of the shock absorber 7 is pivoted, and a second arm 26, provided by projecting lugs, to which the rod 16 is pivoted, the rod 16 being also pivoted at 27 to the wing of the aircraft. The shaft 24 of the lever 14 is pivotally mounted in a yoke portion 28 of the leg casing 5, the arm 25 being provided on the end of the shaft 24 projecting out of the yoke portion 28 at the rear of the leg casing 5, while the lugs 26 are provided on a portion of the shaft 24 disposed between the two arms of the yoke portion 28.

The undercarriage of the second embodiment has the same function as the undercarriage of the first embodiment and obtains the same advantages. In particular, the increased rotation of the lever 14 in the casing 5 in relation to the rotation of casing 5 about the retraction axis XX is to be found once more, due to the particular disposition of the positions of articulation of the rod 16 and the lever 14 in relation to the retraction axis XX.

Naturally, it would also be possible, without departing from the invention, to utilise a lever shaped, as in the first embodiment, with a crank pin, while arranging the positions of articulation of the rod and the lever in relation to the retraction axis in the manner set out in the second embodiment.

In the same way, the shock absorber is illustrated as being pivoted by way of its rod to the lever and by way of its cylinder to the rocking lever so that its least voluminous portion may be housed more easily in the wing in the vicinity of the retraction device, but the shock absorber may be articulated in the more usual manner by way of its rod to the rocking lever and by way of its cylinder to the lever.

The two embodiments described and shown relate to undercarriages with lateral retraction. This is however by no means a limitation of the invention and undercarriages mounted as for longitudinal retraction, with the axis of retraction extending transversely in relation to the aircraft are included within the scope of the invention.

What is claimed is:

1. A wing mounted retractable aircraft undercarriage with a trailing wheel comprising a rigid leg casing, pivotally mounted on the wing about a retraction axis, a rocking lever pivoted on said leg casing, supporting said wheel and mounting the lower pivot connection of a shock absorber located behind said leg casing, an upper pivot connection of said shock absorber to a lever, which said lever is pivotable on said leg casing about an articulation axis which is distinct from said retraction axis, a rod of fixed length pivoted at one end to said lever and at the other end to a fixed position on the wing, so that upon retraction of said undercarriage by the action of a retraction jack, said rod causes rotation of said lever with respect to said leg casing, which rotation, by traction of the expanded said shock absorber causes pivoting, with respect to said leg casing, of said rocking lever mounting said wheel towards said retraction axis, and thus an overall shortening of said undercarriage and wherein in said undercarriage down position, said articulation axis and the axis of articulation of said rod to said lever are situated below and on the retraction side of said retraction axis in relation to the aircraft and said rod is pivoted to said wing at a position located above and on said retraction side of said retraction axis in relation to the aircraft in such manner that, during retraction, the extent of the rotation of said lever with respect to said leg casing is greater than the extent of the rotation of said leg casing with respect to said wing thereby to obtain an increased shortening.

2. A wing mounted retractable aircraft undercarriage as claimed in claim 1, wherein said lever comprises a shaft pivotally mounted in a sleeve formed in said leg casing and mounting a crank pin to which are pivoted about respective eccentric axes the upper end of said shock absorber and said rod.

3. A wing mounted retractable aircraft undercarriage as claimed in claim 1, wherein said lever comprises a shaft pivotally mounted in said leg casing and having a first arm to which the upper end of said shock absorber is pivoted, and a second arm to which said rod is pivoted.

4. A wing mounted retractable aircraft undercarriage as claimed in claim 3, wherein said shaft of said lever is pivotally mounted in a yoked portion of said leg casing, said first arm forms a part of said shaft projecting out of said yoked portion towards the rear of said leg casing and said second arm is located on said shaft between the two arms of said yoked portion.

5. A wing mounted retractable aircraft undercarriage as claimed in claim 1, wherein said retraction axis extends parallel to the longitudinal axis of the aircraft.

6. A wing mounted retractable aircraft undercarriage with a trailing wheel comprising a rigid leg casing, pivotally mounted on the wing about a retraction axis, a rocking lever pivoted on said leg casing, supporting said wheel and mounting the lower pivot connection of a shock absorber located behind said leg casing, an upper pivot connection of said shock absorber to a lever, which said lever is pivotable on said leg casing about an articulation axis which is distinct from said retraction axis, a rod of fixed length pivoted at one end to said lever and at the other end to a fixed position on the wing, so that upon retraction of said undercarriage by the action of a retraction jack, said rod causes rotation of said lever with respect to said leg casing, which rotation, by traction of the expanded said shock absorber causes pivoting, with respect to said leg casing, of said rocking lever mounting said wheel towards said retraction axis, and thus an overall shortening of said undercarriage, and wherein, in said undercarriage down position, said articulation axis is located above and on the retraction side of said retraction axis in relation to the aircraft and said rod is pivoted to said lever and to said wing at positions located on the opposite side of said retraction axis to said retraction side and respectively above and below said retraction axis in relation to the aircraft, such that during retraction the extent of rotation of said lever with respect to said leg casing is greater than the extent of the rotation of said leg casing with respect to said wing thereby to obtain an increased shortening.

7. A wing mounted retractable aircraft undercarriage as claimed in claim 6, wherein said articulation axis is substantially parallel to the axis of symmetry of the aircraft.

8. A wing mounted retractable aircraft undercarriage with a trailing wheel comprising a rigid leg casing, pivotally mounted on the wing about a retraction axis, a rocking lever pivoted on said leg casing, supporting said wheel and mounting the lower pivot connection of a shock absorber located behind said leg casing, an upper pivot connection of said shock absorber to a lever, which said lever is pivotable on said leg casing about an articulation axis which is distinct from said retraction axis, said lever is pivoted to a rear portion of the upper end of said leg casing, and said upper end of said leg casing has a forwardly extending portion by means of which said undercarriage is mounted in cantilever manner on said wing, a rod of fixed length pivoted at one end to said lever and at the other end to a fixed position on the wing, so that upon retraction of said undercarriage by the action of a retraction jack, said rod causes rotation of said lever with respect to said leg casing, which rotation, by traction of the expanded said shock absorber causes pivoting, with respect to said leg casing, of said rocking lever mounting said wheel towards said retraction axis, and thus an overall shortening of said undercarriage.

* * * * *